United States Patent
Toeroe (10) Patent No.: US 8,984,108 B2
(45) Date of Patent: Mar. 17, 2015

(54) DYNAMIC CLI MAPPING FOR CLUSTERED SOFTWARE ENTITIES

(75) Inventor: Maria Toeroe, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 584 days.

(21) Appl. No.: 11/781,418

(22) Filed: Jul. 23, 2007

(65) Prior Publication Data

US 2008/0275973 A1 Nov. 6, 2008

Related U.S. Application Data

(60) Provisional application No. 60/915,751, filed on May 3, 2007.

(51) Int. Cl.
 *G06F 15/173* (2006.01)
 *G06F 9/445* (2006.01)
 *G06F 11/14* (2006.01)
 *G06F 11/20* (2006.01)

(52) U.S. Cl.
 CPC .............. *G06F 8/61* (2013.01); *G06F 11/1482* (2013.01); *G06F 11/2023* (2013.01); *G06F 11/2035* (2013.01)
 USPC ...................................................... 709/223

(58) Field of Classification Search
 USPC ......................................... 709/223, 226, 245
 See application file for complete search history.

(56) References Cited

U.S. PATENT DOCUMENTS

| | | | | |
|---|---|---|---|---|
| 7,657,529 | B2 * | 2/2010 | Kaura et al. | 707/782 |
| 2002/0007468 | A1 * | 1/2002 | Kampe et al. | 714/4 |
| 2002/0165962 | A1 | 11/2002 | Alvarez et al. | |
| 2003/0026525 | A1 * | 2/2003 | Alvarez | 385/16 |
| 2003/0126195 | A1 * | 7/2003 | Reynolds et al. | 709/203 |
| 2004/0216147 | A1 * | 10/2004 | Yanosy et al. | 719/328 |
| 2006/0037016 | A1 * | 2/2006 | Saha et al. | 717/178 |
| 2006/0174037 | A1 * | 8/2006 | Bernardi et al. | 709/245 |
| 2007/0271276 | A1 * | 11/2007 | Allen et al. | 707/10 |

FOREIGN PATENT DOCUMENTS

WO 2006/044701 A1 4/2006

OTHER PUBLICATIONS

Maria Toeroe et al., The Emerging SAF Software Management Framework, Service Availability Lecture Notes in Computer Science; LNCS, Springer, Berlin, DE, vol. 4328, Jan. 1, 2006.

(Continued)

*Primary Examiner* — Asad Nawaz
*Assistant Examiner* — Syed S Ali
(74) *Attorney, Agent, or Firm* — David J Rahmer; Ericsson Canada Inc.

(57) ABSTRACT

Techniques for mapping availability management (AM) functions to software installation locations are described. An availability management function (AMF) can look-up a component type and determine software associated with that component. For a selected AMF node, the AMF software entity can then determine a pathname prefix associated with that software. The pathname prefix can then be used for various AM functions, e.g., instantiation of a new component or service unit.

20 Claims, 7 Drawing Sheets

(56) References Cited

OTHER PUBLICATIONS

International Search Report from corresponding application PCT/IB2008/051546.

Ryoya Mori et al., PC Server Cluster—Focusing on Availability Cluster, Information Processing Society of Japan, Jan. 15, 1998, Journal of Information Processing, vol. 39, No. 1, pp. 49-54 (Translation into English).

* cited by examiner

DYNAMIC CLI MAPPING FOR CLUSTERED SOFTWARE ENTITIES

RELATED APPLICATION

This application is related to, and claims priority from, U.S. Provisional Patent Application Ser. No. 60/915,751, filed on May 3, 2007, entitled "AMF NODE FOR SAF SOFTWARE MANAGEMENT FRAMEWORK" to Maria Toeroe, the disclosure of which is incorporated here by reference.

TECHNICAL FIELD

The present invention generally relates to high availability systems (hardware and software) and, more particularly, to platform management associated with such high availability systems.

BACKGROUND

High-availability systems (also known as HA systems) are systems that are implemented primarily for the purpose of improving the availability of services which the systems provide. Availability can be expressed as a percentage of time during which a system or service is "up". For example, a system designed for 99.999% availability (so called "five nines" availability) refers to a system or service which has a downtime of only about 0.44 minutes/month or 5.26 minutes/year.

High availability systems provide for a designed level of availability by employing redundant nodes, which are used to provide service when system components fail. For example, if a server running a particular application crashes, an HA system will detect the crash and restart the application on another, redundant node. Various redundancy models can be used in HA systems. For example, an N+1 redundancy model provides a single extra node (associated with a number of primary nodes) that is brought online to take over the role of a node which has failed. However, in situations where a single HA system is managing many services, a single dedicated node for handling failures may not provide sufficient redundancy. In such situations, an N+M redundancy model, for example, can be used wherein more than one (M) standby nodes are included and available.

Figure 1:
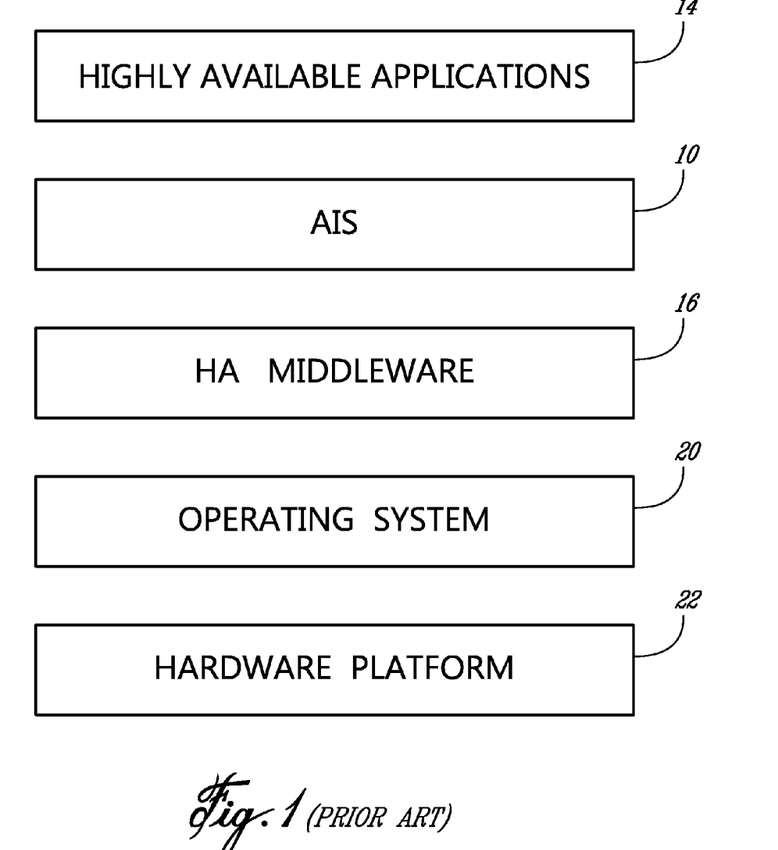
FIG. 1 illustrates a conceptual architecture stack associated with application interface services (AIS)

As HA systems become more commonplace for the support of important services such file sharing, internet customer portals, databases and the like, it has become desirable to provide standardized models and methodologies for the design of such systems. For example, the Service Availability Forum (SAF) has standardized application interface services (AIS) to aid in the development of portable, highly available applications. As shown in the conceptual architecture stack of FIG. 1, the AIS 10 is intended to provide a standardized interface between the HA applications 14 and the HA middleware 16, thereby making them independent of one another. As described below, each set of AIS functionality is associated with an operating system 20 and a hardware platform 22. The reader interested in more information relating to the AIS standard specification is referred to Application Interface Specifications (AIS), Version B.02.01, which is available at www.saforum.org, the disclosure of which is incorporated here by reference.

Of particular interest for the present application is the Availability Management Framework (AMF), which is a software entity defined within the AIS specification. According to the AIS specification, the AMF is a standardized mechanism for providing service availability by coordinating redundant resources within a cluster to deliver a system with no single point of failure. The AMF provides a set of application program interfaces (APIs) which determine, among other things, the states of components within a cluster and the health of those components. The components are also provided with the capability to query the AMF for information about their state. An application which is developed using the AMF APIs and following the AMF system model leaves the burden of managing the availability of its services to the AMF. Thus, such an application does not need to deal with dynamic reconfiguration issues related to component failures, maintenance, etc.

Figure 2:
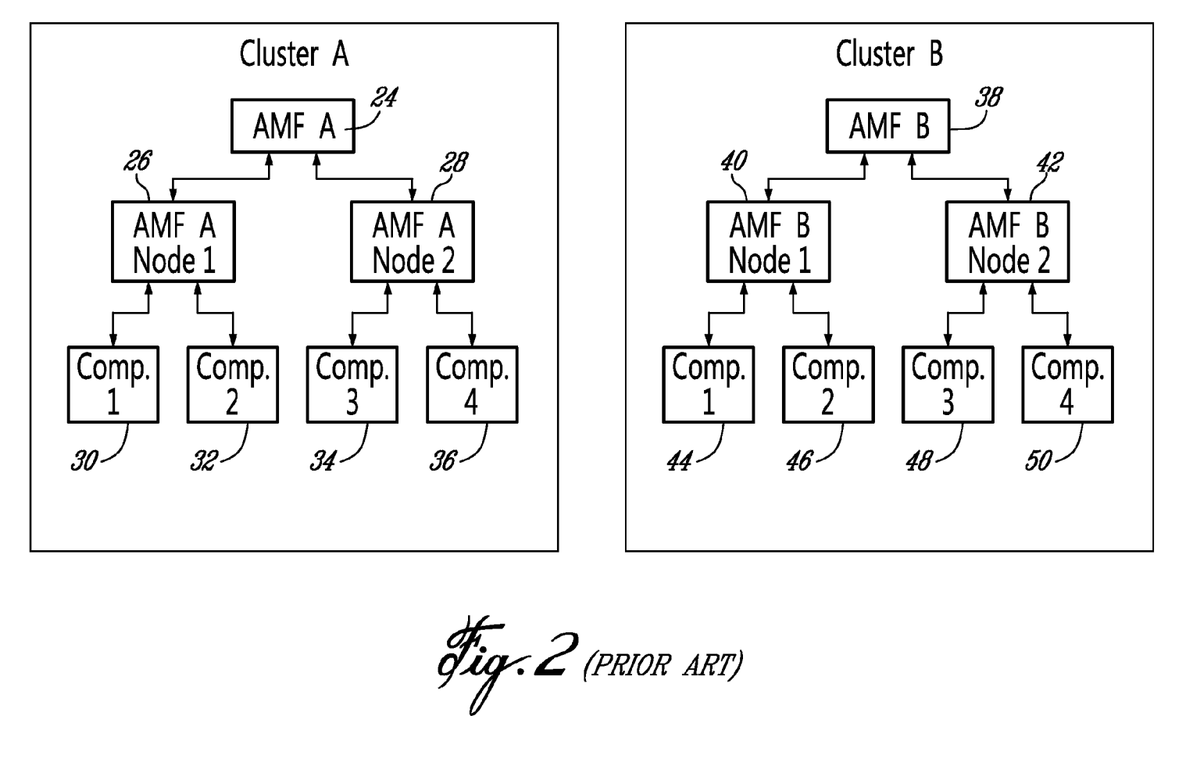
FIG. 2 illustrates an availability management framework (AMF) cluster architecture.

As specified in the foregoing standards, each AMF (software entity) provides availability support for a single logical cluster that consists of a number of cluster nodes and components an example of which is shown in FIG. 2. Therein, a first cluster A includes its own AMF 24, two AMF nodes 26, 28 and four AMF components 30-36. Similarly, a second cluster B has its own AMF 38, two AMF nodes 40, 42 and four AMF components 44-50. The components 30-36 and 44-50 each represent a set of hardware and software resources that are being managed by the AMFs 24 and 38, respectively. In a physical sense, components are realized as processes of an HA application. The nodes 26, 28, 40, 42 each represent a logical entity which corresponds to a physical node on which respective processes managed as AMF components are being run, as well as the redundancy elements allocated to managing those nodes' availability.

The AIS standard also defines a service unit (SU) as a logical entity that aggregates a set of components, thereby combining their individual functionalities to provide a higher level service. A service unit can contain any number of components, but a particular component can be configured in only one service unit. Since each component is always enclosed in a service unit, from the AMF's perspective, the service unit can be considered the incremental unit of redundancy in the sense that it is the smallest logical entity that can be instantiated in a redundant manner, i.e., more than once. Another example of an AMF model including service units and components is provided below as FIG. 3.

At the leaves of this model, each component 30-36 and 44-50 has an attribute which specifies where the corresponding software installation is located. More specifically, this attribute specifies a path prefix that is used when a corresponding service unit is instantiated. However this path prefix assumes that the component is always instantiated on the same node or that the component is instantiated on a node where there is an installation of the software at a location having the same path. In current clusters, this latter characteristic is typically true, i.e., the installation path is always the same on all of the nodes. If, however, this assumption is not necessarily true, e.g., in heterogeneous clusters where some clusters may be diskless (e.g., using a RAM disk), while other nodes may use mounted disks or have local disks (or if the nodes run different operating systems), then the instantiation will fail.

Accordingly, it would be desirable to provide platform management systems and methods for HA applications which avoid the afore-described problems and drawbacks by permitting, for example, flexible service unit instantiation.

SUMMARY

According to an exemplary embodiment, a method for instantiating from a local node a component on a remote node includes the steps of: obtaining a type identifier of the component to be instantiated at the local node, determining, from the type identifier, at the local node, a software identifier that corresponds to the component, determining, at the local node, a plurality of remote nodes on which a software corresponding to the software identifier is installed, determining, at the local node, the remote node from the plurality of remote nodes on which the component is to be instantiated, and obtaining, at the local node, a specific software's installation location on the remote node using the component's type and the software identifier.

According to another exemplary embodiment, an Availability Management Framework (AMF) logical node used for instantiating a component on a remote node, the AMF logical node includes a lookup module that: receives a type identifier of the component to be instantiated at the local node, determines from the type identifier a software identifier that corresponds to the component, determines a plurality of remote nodes on which a software corresponding to the software identifier is installed, determines the remote node from the plurality of remote nodes on which the component is to be instantiated, and obtains a specific software's installation location on the remote node using the component's type and the software identifier.

According to yet another exemplary embodiment, a method for executing a Command Line Interface (CLI) command for a component associated with an Availability Management Framework (AMF) node includes the steps of: looking up a type associated with said component, identifying software associated with the component based on the type, looking up a pathname prefix for the identified software, and using the pathname prefix to execute the CLI command.

According to still another exemplary embodiment, a method for mapping a component to an Availability Management Framework (AMF) node includes the steps of: determining the component's type, determining a software identifier for software associated with the component based on the determined type, selecting the AMF node onto which the component is to be mapped, and determining a node-specific installation location for the software on the AMF node from an AMF attribute using the determined type and the determined software identifier.

According to another exemplary embodiment, a computer-readable medium contains instructions which, when executed on a computer or processor, perform the steps of: looking up a type associated with the component, identifying software associated with the component based on the type, looking up a pathname prefix for the identified software, and using the pathname prefix to execute the CLI command.

According to another exemplar embodiment, a system includes a hardware platform for supporting a service, and an availability management function (AMF) software entity which supports availability of the service, the AMF software managing lifecycle functionality of a component associated with the service including performing the functions of: looking up a type associated with the component, identifying software associated with the component based on the type, looking up a pathname prefix for the identified software, and using said pathname prefix to instantiate the component.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 3:
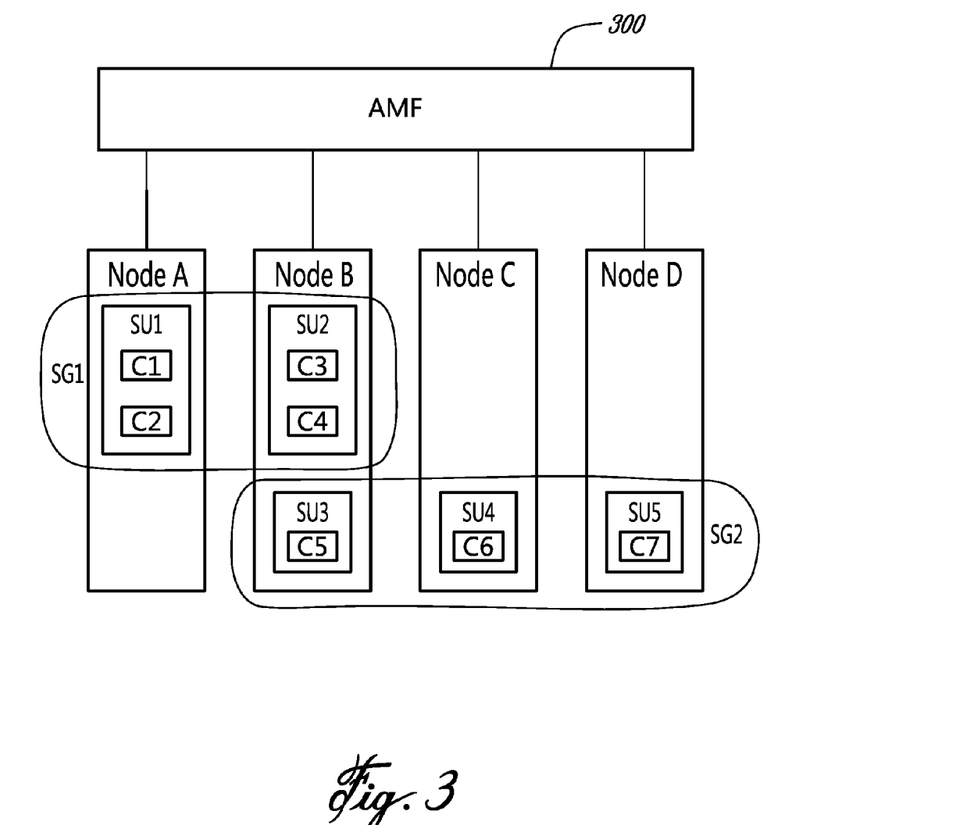
FIG. 3 shows an exemplary AMF managed system including service units and components.

To provide some additional context for this discussion, consider another exemplary AMF controlled system as shown in FIG. 3. Therein, four nodes (A, B, C and D) are associated with two service groups (SG1 and SG2). A service group is a group of service units (SUs) which provide service availability for one or more instances of a particular service. For example, SG1 includes SU1 and SU2 which, in this example, support an instance of an e-mail service (hardware and software) and SG2 includes SU3, SU4 and SU5, which support two instances of a fax service (hardware and software). For the email service instance supported by SG1, SU1 is assigned to the active state and SU2 is assigned to the standby state.

Each of the exemplary service units in SG1 has two components associated therewith. A component is the smallest logical entity on which the AMF 300 performs error detection and isolation, recovery, and repair. Thus, a component typically includes all of the functions which cannot be clearly separated for error containment or isolation purposes. These components can further be grouped into protection groups which reflect the redundancy associated with provision of email service availability. For example, component C1 and C3 can form a first protection group and component C2 and C4 can form a second protection group associated with the email service instance. Thus if component C1 fails, the AMF 300 could switch component C3 to the active state and, similarly, if component C2 fails, then the AMF 300 could switch component C4 to the active state.

Service group SG2 illustrates a slightly different configuration wherein two instances of a fax service are supported by three service units SU3, SU4 and SU5. For example, SU3 and SU4 could each be assigned the active state such that each supports one instance of the fax service, while SU5 could be assigned the standby state and operate as their redundant backup. In this case, components C5 and C7 would form one protection group associated with one of the two fax service instances and components C6 and C7 could form a second protection group associated with the other of the two fax service instances. AMF software entity 300 can operate as described in the above-incorporated by reference AIS standard, with the exception that component lifecycle handling, e.g., instantiation, and related functions will be performed as described below.

Figure 4:
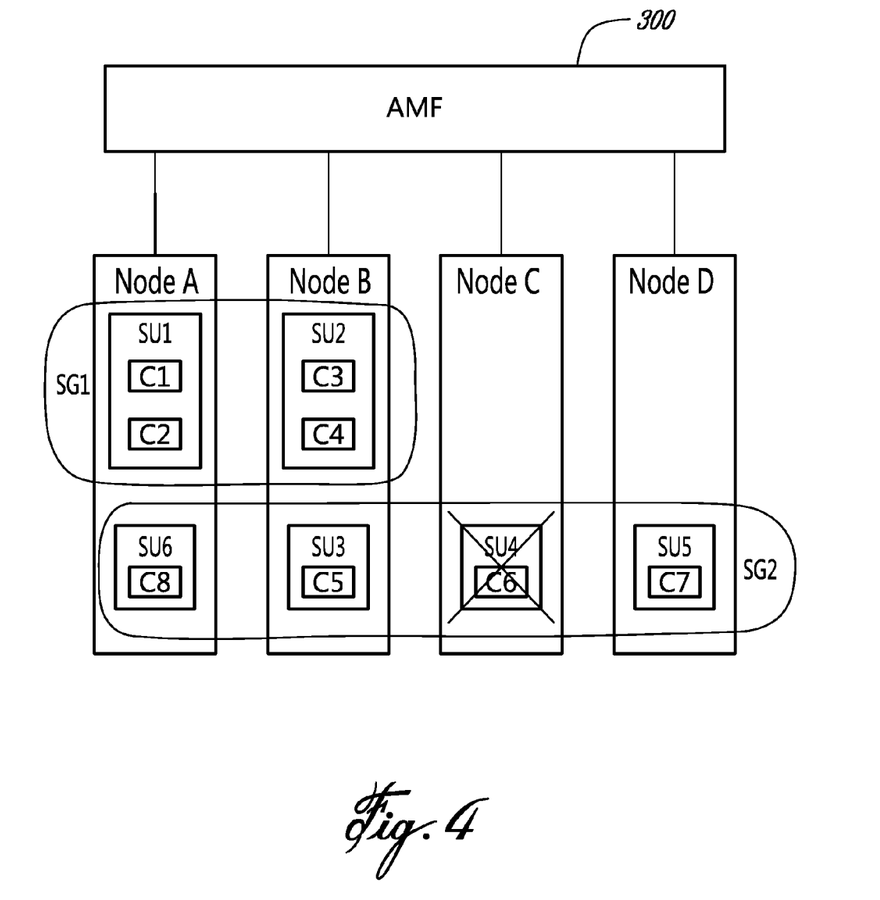
FIG. 4 depicts the exemplary AMF managed system of FIG. 3 wherein one service unit has been terminated and another service unit instantiated according to an exemplary embodiment.

As mentioned above, exemplary embodiments address the situation where an AMF entity instantiates a new service unit and associated component(s) (or performs other lifecycle tasks). In the context of the example of FIG. 3, suppose that the component C6 associated with service units SU4 fails. In this case, when notified of the failure condition, AMF 300 could switch SU5 from its standby state to an active state to maintain availability of the second fax service instance. However the AMF 300 might also decide to instantiate a new service unit and associated component with the requisite software to perform the standby role vacated by SU5. For example, as shown in FIG. 4, AMF 300 could decide to terminate SU4/C6 and instantiate SU6/C8 to assume the new standby role for the second fax service instance. To perform this instantiation, instead of assuming that the pathname associated with the required software will always be the same for a component which performs this particular fax service, according to these exemplary embodiments the AMF 300 can obtain this path information (as well as, optionally, other information regarding component lifecycle commands) from one of the nodes on which this particular component type is running as described below.

For example, each component, e.g., C1-C7, will have a component type associated therewith as an attribute which can be read or looked up by the AMF 300. The component type will, in turn, refer to a software identifier which identifies the software which is needed to enable that particular component's functionality, i.e., the portion of the service which it supports within its assigned service unit. Further each AMF node, e.g., nodes A-D in FIGS. 3 and 4, will have an attribute associated therewith which indicates which software packages are installed thereon. These attributes and identifiers can be stored as objects, e.g., in a database (not shown) by, for example, an SAF service referred to as the Information Model Management Service (IMM). The AMF 300 can then obtain the afore-described information from the corresponding objects stored within the IMM. Different systems may implement the IMM database in different ways, however the AMF 300 will be provided with an interface via which it can retrieve the stored attribute/identifier information according to these exemplary embodiments. Alternatively, an AMF implementation may have its own copy of this information. There also may be provided within the system a management information base (MIB) based on this information model providing SNMP access to read and set this configuration data. Regardless of the particular manner in which this information is stored and retrieved, the AMF 300 will use this information to, for example, instantiate the new service unit/component combination SU6/C8 in FIG. 4 according to the exemplary embodiment illustrated in the flowchart of FIG. 5.

Figure 5:
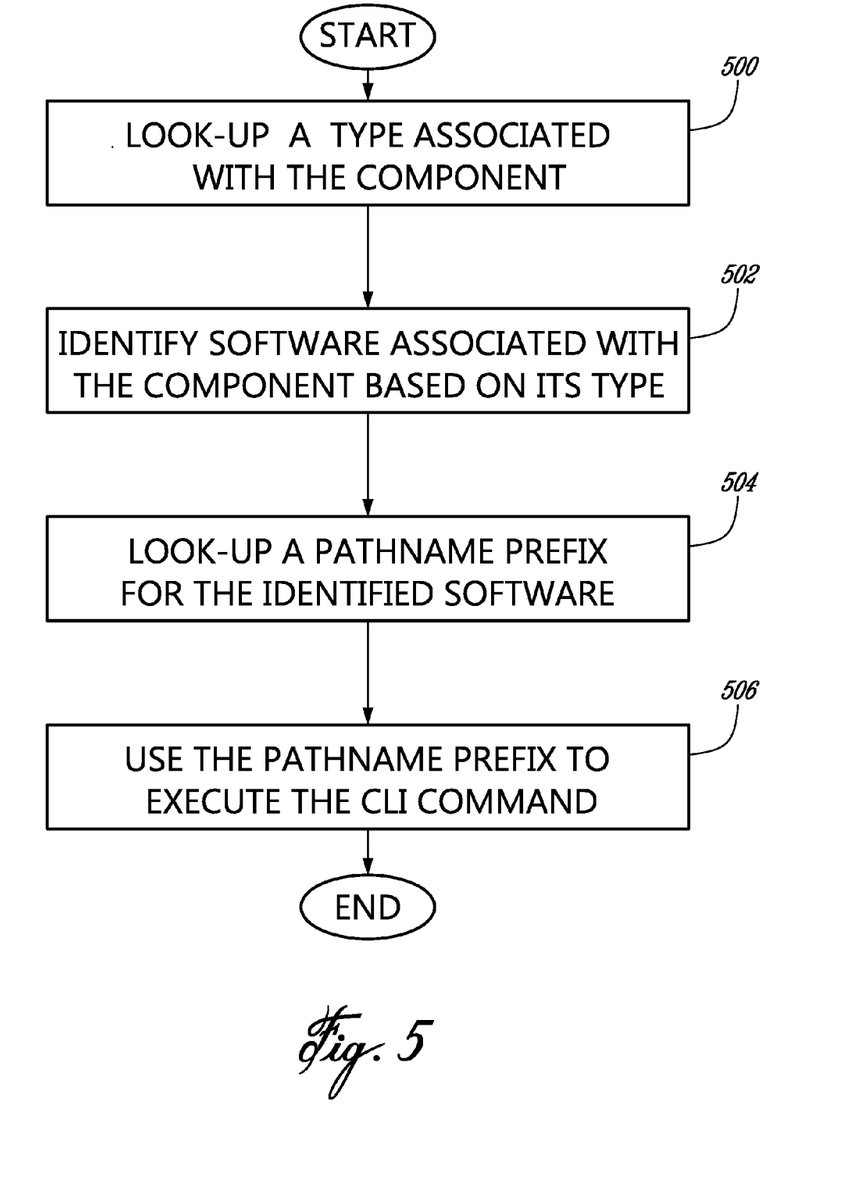
FIG. 5 is a flowchart illustrating a method for executing a Command Line Interface (CLI) command for a component associated with an Availability Management Framework (AMF) node according to an exemplary embodiment.

Therein, at step 500, AMF 300 looks-up a type associated with the component, e.g., component C6 in the example of FIGS. 3 and 4. The type value provides, in turn, a software identifier value which enables AMF 300 to identify the software associated with the component C6 at step 502. With the software identifier, AMF 300 can then look-up a pathname prefix for the AMF node which has been selected for instantiation of SU6/C8, e.g., AMF node A in the example of FIG. 3 and 4, at step 504. There are various ways in which a particular AMF node can be selected from among the available nodes for instantiation of SU6/C8. For example, service unit or service group attributes available, e.g., from the IMM, may indicate the node group on which a particular SU or SU of the service group can be instantiated. The AMF 300 can select from the resulting list of AMF nodes, if such information is available, e.g., based on the order in which nodes are listed. Otherwise, AMF 300 may select any node in the cluster, e.g., based on load, on which to instantiate the service unit/component(s).

The pathname prefix is an AMF node-specific and software-specific prefix which, when concatenated with a per-command relative pathname associated with the component's type, defines a pathname for a Command Line Interface (CLI) command. This concatenation is one example of how the pathname prefix which was obtained by the AMF 300 can be used at step 506 to execute a CLI command, e.g., such as a command to instantiate a new service unit/component. Note that, although these exemplary embodiments have focused on instantiation and corresponding CLI commands, they are not limited thereto. Instead, these exemplary embodiments may also be used to facilitate other CLI commands associated with component lifecycle such as those associated with termination, cleanup, AM_start and AM_stop. The terminate command is used to stop a component and by that the service being provided by the component and leaves that component uninstantiated. The cleanup command also leaves a component uninstantiated and is used when the AMF 300 is recovering from errors. The AM_start command can be executed by the AMF 300 after a component has been successfully instantiated or to resume monitoring of a component to periodically assess the health of the component. The AM_com-mand can be executed by the AMF 300 to stop monitoring of a particular component.

Figure 6:
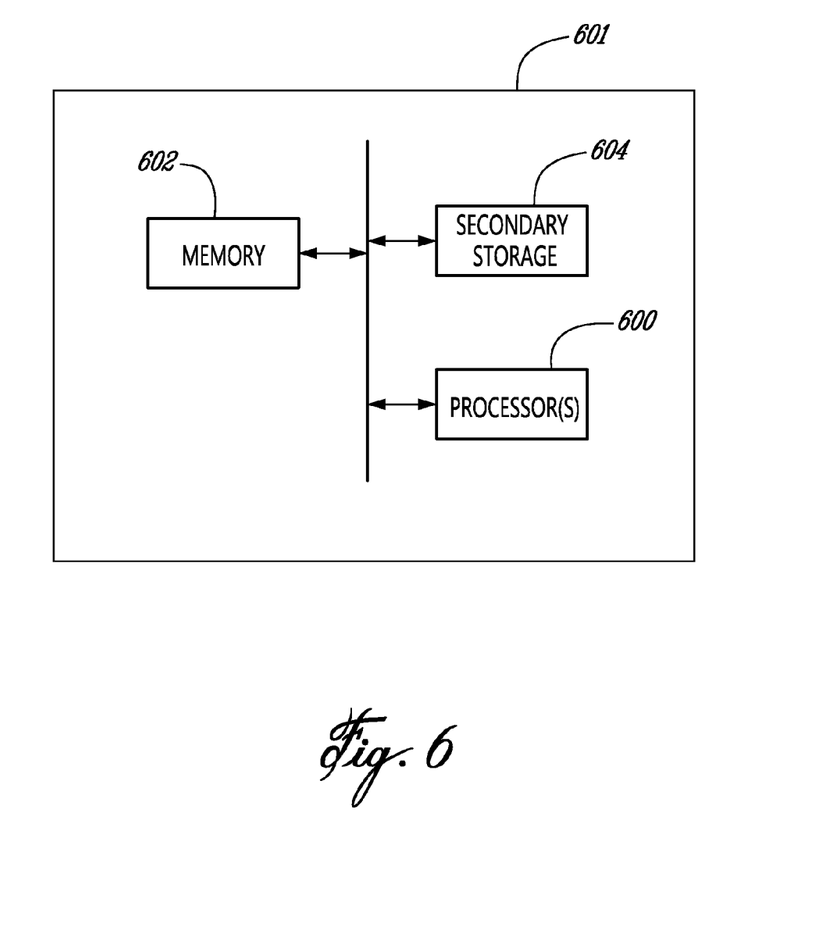
FIG. 6 is an illustration of a node/portion of a system according to an exemplary embodiment.

Referring to FIG. 6, systems and methods for processing data according to exemplary embodiments of the present invention can be performed by one or more processors 600, e.g., part of a server 601, executing sequences of instructions contained in a memory device 602. Such instructions may be read into the memory device 602 from other computer-readable mediums such as secondary data storage device(s) 604. Execution of the sequences of instructions contained in the memory device 602 causes the processor 600 to operate, for example, as described above. In alternative embodiments, hard-wire circuitry may be used in place of or in combination with software instructions to implement the present invention.

Figure 7:
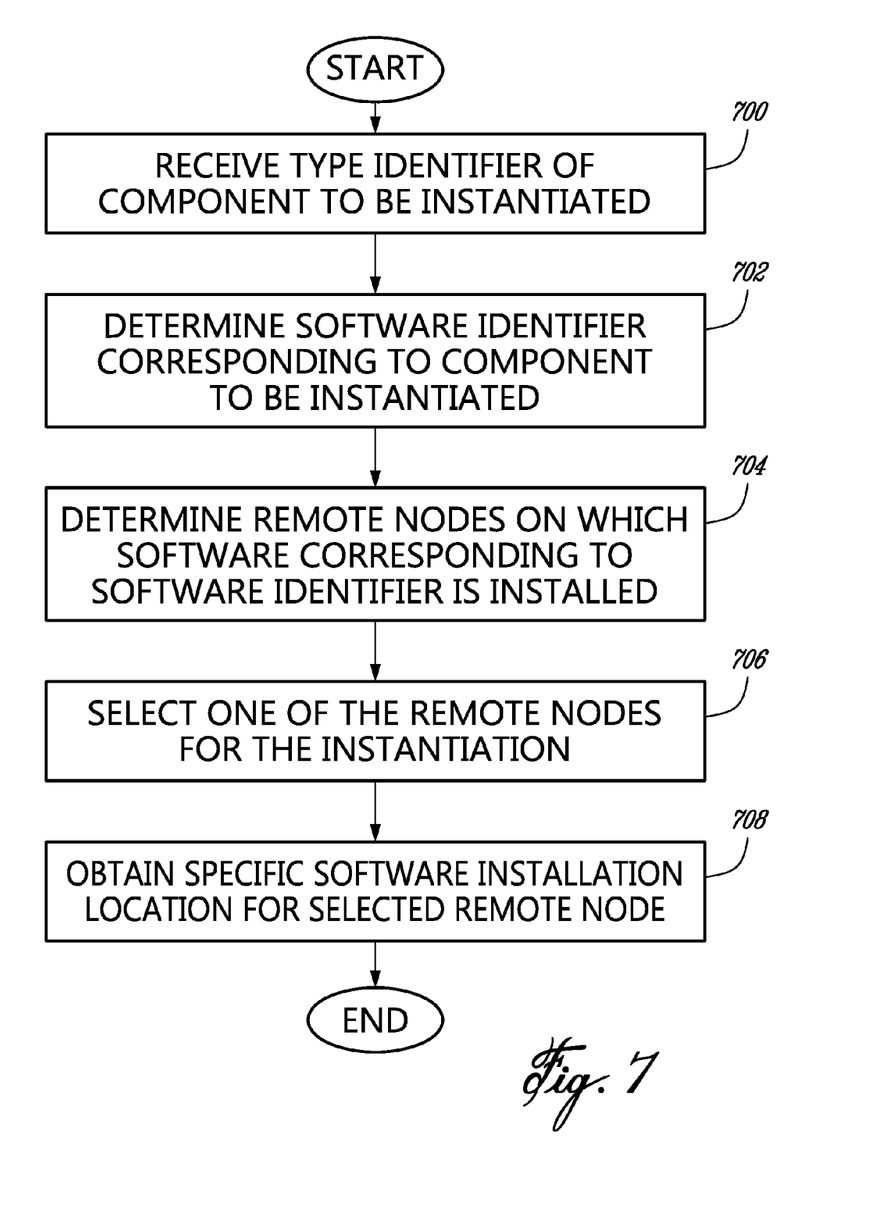
FIG. 7 is a flowchart illustrating a method for instantiating a component on a remote node according to another exemplary embodiment.

Regardless of the particular manner in which these exemplary embodiments are implemented, it will be appreciated that an AMF software entity according to these exemplary embodiments may include a lookup software module which is stored on a computer-readable medium and contains instructions which, when executed on a computer or processor, perform the steps illustrated in the flowchart of FIG. 7. Therein, at step 700, the look-up module receives a type identifier of the component to be instantiated at the local node. Then, at step 702, the look-up module determines, from the type identifier, a software identifier that corresponds to the component to be instantiated. At step 704, the look-up module determines a plurality of remote nodes on which software corresponding to the software identifier is installed and, then at step 706 determines the remote node from the plurality of remote nodes on which the component is to be instantiated. The specific software's installation location on the remote node is obtained at step 708 using the component's type and the software identifier.

According to exemplary embodiments, the attribute associated with each AMF node which indicates the software installed thereon and its location can be updated with new software information, e.g., when software is installed on the node. In this way, the AMF software entity will have access to up-to-date information when it seeks to map a CLI command onto any of the nodes which it is managing. Moreover, since the AMF nodes are themselves logical entities which can potentially be mapped on to different physical nodes (e.g., Cluster Membership (CLM) nodes), a similar CLI mapping to that described above can be performed recursively on the different levels of the system model. That is, this mapping can be performed when a CLM node is mapped onto an operating system instance, and when the AMF node is mapped onto the CLM node.

With respect to the foregoing, consider the following example. Suppose that a new hardware node is added to an AMF-managed HA system. This system can, for example, host two cluster nodes and an AMF node on each. Thus, at the AMF level two nodes are added (or if they belong to different AMF clusters, one node for each cluster). However, in this exemplary system there is only one physical node with a disk, which may be dedicated completely to one of the cluster nodes or shared between the two, etc. Each different configuration may mean a different mapping of the software of the AMF node onto the physical storage of the disk. If the nodes belong to different clusters, then the requirement for isolating the software images can be much more strict, so there could be two different images. When the AMF node is instantiated, i.e., in the same way as for the components described above when they are instantiated onto a different node, there can be provided a mapping to according to these exemplary embodiments to enable finding the software that should be available on the AMF node and configured at the AMF node level.

Dynamic CLI mapping can also be performed toward higher layers in an AMF-managed system. For example, container components, which may be used in AMF-managed systems to integrate components (Java, C++, etc.) which are not executed directly by an operating system, may also benefit from the afore-described techniques. Thus, if a container component that manages the life cycle of some contained components is put on a node, then such a container can perform the mapping described above for the AMF for CLI commands when the container needs to obtain path information from (or about) a particular node.

The foregoing description of exemplary embodiments of the present invention provides illustration and description, but it is not intended to be exhaustive or to limit the invention to the precise form disclosed. For example, the component itself may provide some portion of the path information relative to the installation location of its software. Modifications and variations are possible in light of the above teachings or may be acquired from practice of the invention. The following claims and their equivalents define the scope of the invention.

The invention claimed is:

1. A method for instantiating from a local node a component, on a remote node included in a cluster of different types of remote nodes having different node-specific component installation locations, comprising the steps of:
   obtaining at the local node, a type identifier of the component to be instantiated;
   determining, from the type identifier, at the local node, a software identifier that corresponds to the component;
   determining, at the local node, a plurality of remote nodes on which a software corresponding to the software identifier is installed;
   selecting, at the local node, a remote node from the plurality of remote nodes on which the component is to be instantiated;
   determining, at the local node, a node-specific installation location on the selected remote node in accordance with the type identifier and the software identifier; and
   instantiating the component at the node-specific installation location on the selected remote node;
   wherein the component is a smallest logical entity associated with a service on which an Availability Management Framework (AMF) entity performs error detection and isolation, recovery and repair.

2. The method of claim 1 further comprising the step of:
   updating, in the local node, the node-specific installation location each time a new software is installed on any of the plurality of remote nodes.

3. An Availability Management Framework (AMF) logical node used for instantiating, from a local node, a component, on a remote node included in a cluster of different types of remote nodes having different node-specific component installation locations, the AMF logical node comprising:
   a lookup module that:
      receives, at the local node, a type identifier of a component to be instantiated;
      determines from the type identifier a software identifier that corresponds to the component;
      determines a plurality of remote nodes on which a software corresponding to the software identifier is installed;
      selects a remote node from the plurality of remote nodes on which the component is to be instantiated; and
      determines, in accordance with the type identifier and the software identifier, a node-specific installation location on the selected remote node;
      wherein the component is instantiated at the node-specific installation location on the selected remote node; and
      wherein the component is a smallest logical entity associated with a service on which the AMF logical node performs error detection and isolation, recovery and repair.

4. A method for executing a Command Line Interface (CLI) command through an Availability Management Framework for a component, associated with an Availability Management Framework (AMF) node included in a cluster of different types of remote nodes having different node-specific pathname prefix for the component, the method comprising:
   looking up, at a first AMF node, a type identifier associated with said component;
   identifying a software identifier of a software associated with said component based on said type identifier;
   looking up a pathname prefix specific to a second AMF node for said software in accordance with the type identifier and the software identifier;
   using said pathname prefix to execute said CLI command for the component of the second AMF node; and
   using said CLI command to instantiate said component;
   wherein said component is a smallest logical entity associated with a service on which an AMF entity performs error detection and isolation, recovery and repair.

5. The method of claim 4, wherein said CLI command is a command used to perform one of: terminating said component, cleaning up said component, AM_starting said component and AM_stopping said component.

6. The method of claim 4, wherein said software is software associated with provision of a service provided by a service unit to which said component is assigned.

7. The method of claim 4, wherein said pathname prefix is an AMF node-specific and software-specific prefix which, when concatenated with a per-command relative pathname associated with said component's type, defines a pathname for a Command Line Interface (CLI) command.

8. A method for mapping a component, to an Availability Management Framework (AMF) node included in a cluster of different types of remote nodes having different node-specific installation locations for the component, the method comprising:
- determining a type identifier associated with said component;
- determining a software identifier for software associated with said component based on said determined type identifier;
- selecting an AMF node onto which said component is to be mapped;
- determining a node-specific installation location, specific to said AMF node, for said software on said AMF node from an AMF attribute in accordance with said determined type identifier and said determined software identifier; and
- instantiating the component at the node-specific installation location on the AMF node;
  - wherein said component is a smallest logical entity associated with a service on which an AMF entity performs error detection and isolation, recovery and repair.

9. The method of claim 8, wherein is software associated with provision of a service provided by a service unit to which said component is assigned.

10. The method of claim 8, further comprising:
- updating, said software's node-specific installation location each time a new version of said software is installed on any of a plurality of nodes.

11. A computer-readable medium containing instructions which, when executed on a computer or processor executing a Command Line Interface (CLI) command for a component associated with a remote node included in a cluster of different types of remote nodes having different node-specific pathname prefix for the component, perform the steps of:
- looking up a type associated with said component; which is a logical entity associated with a service resident on a remote node;
- identifying a software identifier of a software associated with said component based on said type identifier;
- determining a pathname prefix specific to the remote node for said identified software identifier in accordance with the type identifier and the software identifier;
- using said determined pathname prefix to execute said CLI command for the component of the remote node; and
- using said CLI command to instantiate said component;
  - wherein said component is a smallest logical entity associated with a service on which an Availability Management Framework (AMF) entity performs error detection and isolation, recovery and repair.

12. The computer-readable medium of claim 11, wherein said CLI command is a command used to perform one of: terminate said component, cleanup said component, AM_starting said component and AM_stopping said component.

13. The computer-readable medium of claim 11, wherein said software is software associated with provision of a service provided by a service unit to which said component is assigned.

14. The computer-readable medium of claim 11, wherein said pathname prefix is an AMF node-specific and software-specific prefix which, when concatenated with a per-command relative pathname associated with said component's type, defines a pathname for a Command Line Interface (CLI) command.

15. The computer-readable medium of claim 11, further comprising:
- updating said node-specific pathname prefix each time a new version of said software is installed on any of a plurality of nodes.

16. A system comprising:
- a hardware platform for supporting a service; and
- an availability management function (AMF) software entity which supports availability of said service, said AMF software executing a Command Line Interface (CLI) command for a component associated with an AMF node included in a cluster of different types of remote nodes having different node-specific pathname prefix for the component to manage lifecycle functionality of the component, including performing the functions of:
- looking up a type identifier associated with said component associated with a first AMF node;
- identifying a software identifier of a software associated with said component based on said type identifier;
- looking up a pathname prefix specific to a second AMF node for said identified software, said pathname prefix identifying a software installation location on the second AMF node; and
- using said pathname prefix to instantiate said component on the second AMF node;
  - wherein said component is a smallest logical entity associated with a service on which an AMF entity performs error detection and isolation, recovery and repair.

17. The system of claim 16, wherein said lifecycle functionality includes at least one of: terminate said component, cleanup said component, AM_starting said component and AM_stopping said component.

18. The system of claim 16, wherein said software is software associated with provision of a service provided by a service unit to which said component is assigned.

19. The system of claim 16, wherein said pathname prefix is an AMF node-specific and software-specific prefix which, when concatenated with a per-command relative pathname associated with said component's type, defines a pathname for a Command Line Interface (CLI) command.

20. The system of claim 16, wherein said AMF software updates said node-specific pathname prefix each time a new version of said software is installed on any of a plurality of nodes.

* * * * *